United States Patent
Liao et al.

(10) Patent No.: US 9,245,483 B2
(45) Date of Patent: Jan. 26, 2016

(54) BACKLIGHT MODULE AND DISPLAY APPARATUS

(71) Applicant: Au Optronics Corporation, Hsinchu (TW)

(72) Inventors: Super Liao, Hsinchu County (TW); Po-Chun Hsu, New Taipei (TW); Chih-Wei Chang, Pingtung County (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 14/702,774

(22) Filed: May 4, 2015

(65) Prior Publication Data

US 2015/0235598 A1 Aug. 20, 2015

Related U.S. Application Data

(63) Continuation of application No. 12/684,128, filed on Jan. 8, 2010.

(30) Foreign Application Priority Data

Oct. 16, 2009 (TW) .................. 98135132 A

(51) Int. Cl.
G09G 3/36 (2006.01)
G02F 1/13357 (2006.01)
G09G 3/34 (2006.01)
F21V 8/00 (2006.01)

(52) U.S. Cl.
CPC .............. *G09G 3/3426* (2013.01); *G02B 6/005* (2013.01); *G02B 6/0046* (2013.01); *G02B 6/0068* (2013.01); *G02B 6/0083* (2013.01); *G09G 2300/0426* (2013.01); *G09G 2320/0233* (2013.01)

(58) Field of Classification Search
CPC .... G02B 6/005; G02B 6/0046; G02B 6/0068; G02B 6/0083; G09G 3/342; G09G 3/3406; G09G 3/3413; G09G 3/3426; G09G 2300/0426; G09G 2320/0233
See application file for complete search history.

(56) References Cited

U.S. PATENT DOCUMENTS

| | | | |
|---|---|---|---|
| 2007/0013647 A1* | 1/2007 | Lee ................. | H05B 33/0857 345/102 |
| 2010/0245228 A1* | 9/2010 | Chen ................. | G09G 3/3413 345/102 |
| 2011/0090141 A1* | 4/2011 | Liao ................. | G02B 6/0068 345/102 |

\* cited by examiner

*Primary Examiner* — Stephen F Husar
(74) *Attorney, Agent, or Firm* — Jianq Chyun IP Office

(57) ABSTRACT

A backlight module including a light guide plate, light source sets, and controlling circuits is provided. The light guide plate has a plurality of regions, and each region of the light guide plate has a light incident surface correspondingly. Each light source set is disposed at the light incident surface of one of the regions of the light guide plate, and each light source set has at least one middle light source and at least one edge light source. The middle light source is disposed in a middle region of the light source set and the edge light source is disposed at an edge of the light source set. Each controlling circuit is electrically connected to the middle light source of one of the light source sets, and the edge light source of each light source set is electrically connected to the controlling circuit of the adjacent light source set.

20 Claims, 16 Drawing Sheets

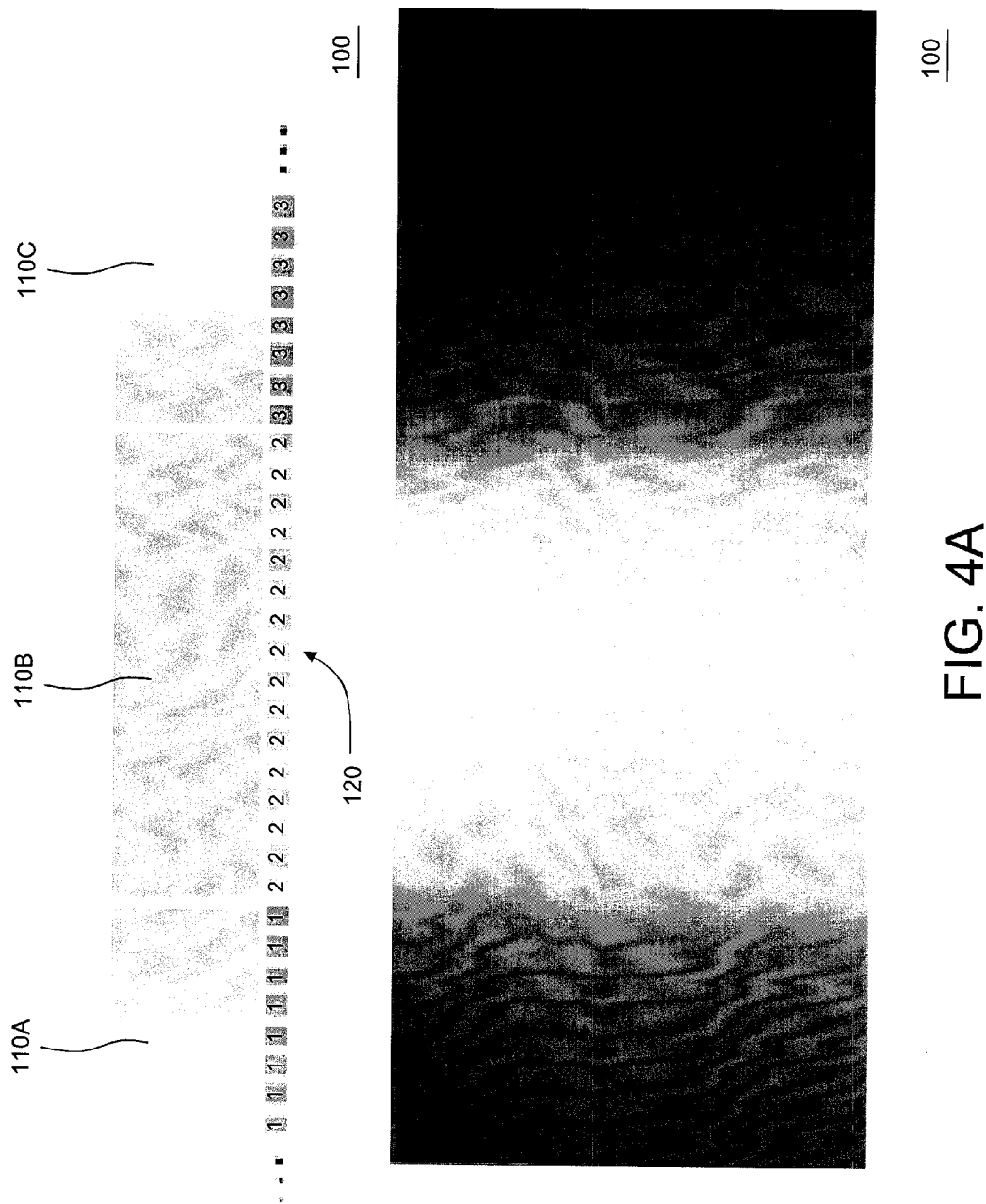

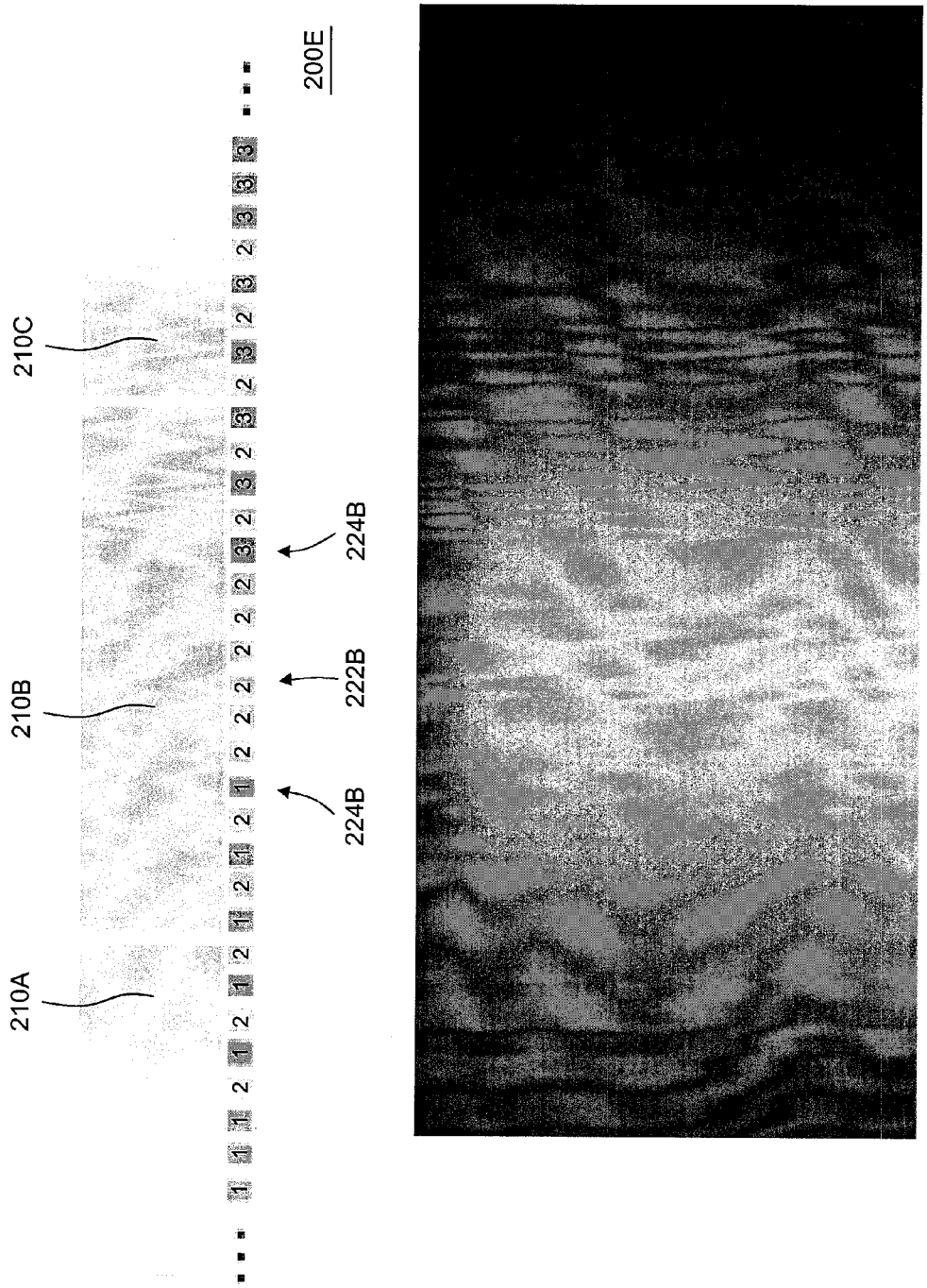

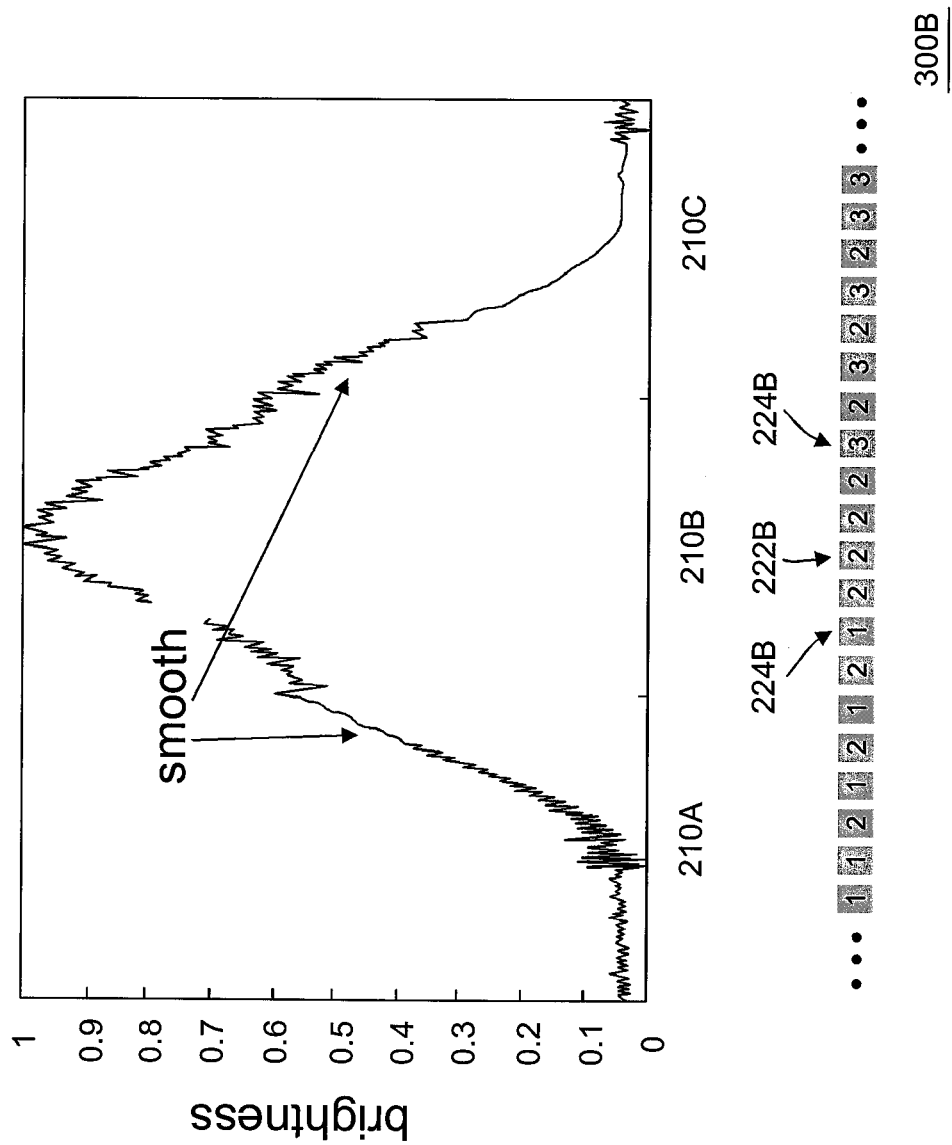

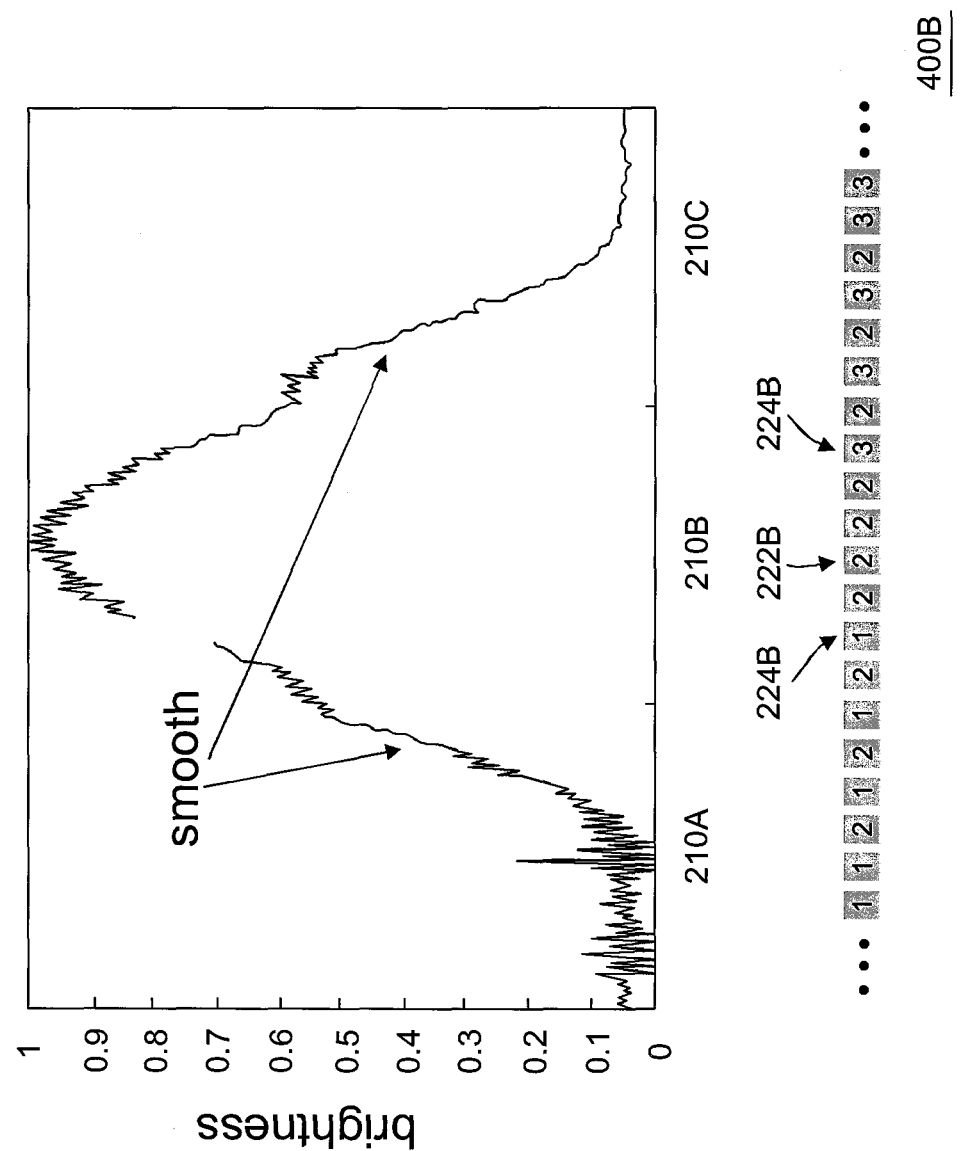

BACKLIGHT MODULE AND DISPLAY APPARATUS

CROSS-REFERENCE TO RELATED APPLICATION

This application is a continuation application of and claims the priority benefit of U.S. application Ser. No. 12/684,128, filed on Jan. 8, 2010, now pending. The prior application Ser. No. 12/684,128 claims the priority benefit of Taiwan application serial no. 98135132, filed on Oct. 16, 2009. The entirety of each of the above-mentioned patent applications is hereby incorporated by reference herein and made a part of specification.

BACKGROUND OF THE INVENTION

1. Field of the Invention

The present invention relates to a light source device and a display apparatus, and more particularly to a backlight module and a display apparatus.

2. Description of Related Art

Recently, with the advantages of small volume, light weight, low drive voltage, low power consumption, a wide range of applications in notebook, camera, television and other electronic image device, the liquid crystal display (LCD) has replaced the cathode ray tube (CRT).

Generally, the LCD comprises an LCD panel and a backlight module. The LCD panel displays an image through the twist of liquid crystal molecules and the polarizing plates to change the transmittance in different regions. Since the liquid crystal molecules do not emit light, a backlight module is needed to provide a light source. The backlight module can be divided into a side type backlight module and a direct type backlight module. In order to achieve uniform light mixing effect, a longer light mixing distance for the direct type backlight module is needed, so that the direct type backlight module has a thicker thickness. Thereby, the direct type backlight module is not suitable for a thinness LCD, while the edge type backlight module has an advantage for thinning.

As development of large size and high contrast of the LCD, a backlight module which using local dimming is provided to achieve high dynamic contrast display effect. In addition, comparing with the direct type backlight module, the edge type backlight module having a joining type light guide plate configuration, which using local dimming, is more suitable for thinning.

FIG. 1 is a schematic view illustrating a conventional backlight module. Referring to FIG. 1, a backlight module 100 is composed of a plurality of light guide plates 110 which are joined together, and a local dimming is used to achieve high dynamic contrast display effect. As FIG. 1 shown, the light source set 120a of the light guide plate 110a in a display region is lit, and the light source sets 120 of the light guide plates 110 in a non-display region are turned off, such that the contrast of the LCD is increased. However, when the above mentioned local dimming is performed, a joining boundary is easily displayed on an image because the light guide plates have different brightness, so as to deteriorate the display quality.

In order to resolve the above problem, a method of increasing the number of the local dimming regions of a backlight module is provided. However, if the number of the local dimming regions is increased, the number of light guide plates, the number of local dimming driving chips, and the difficult of processing the image are increased, and thus the manufacturing cost is increased. Another method of additionally adding optical films having diffusing function in a backlight module is also provided to resolve the problem of showing the joining boundary on a displayed image. However, with this method, the weight of the backlight module and the cost are increased, and the total brightness of the backlight module is reduced. Thereby, the number of light sources or the driving power is needed to increase to compensate the brightness loss from the additional added optical films. As a result, the power consumption of the backlight module is increased.

SUMMARY OF THE INVENTION

The present invention provides a backlight module capable of blurring the joining boundary between the light guide plates, such that the backlight module has uniform brightness.

The present invention provides a display apparatus which has a backlight module having uniform brightness, so as to improve display quality.

The present invention provides a backlight module including a light guide plate, a plurality of light source sets, and a plurality of controlling circuits. The light guide plate has a plurality of regions, wherein each region of the light guide plate has a light incident surface correspondingly. Each light source set is disposed at the light incident surface of one of the regions of the light guide plate, and each light source set has at least one middle light source and at least one edge light source. The middle light source is disposed in a middle region of the light source set and the edge light source is disposed at an edge of the light source set. Each controlling circuit is electrically connected to the middle light source of one of the light source sets, and the edge light source of each light source set is electrically connected to the controlling circuit of the adjacent light source set.

In an embodiment of the present invention, the at least one edge light source of each light source set is disposed at one or more side(s) of the at least one middle light source of the light source set. The number of the at least one edge light source disposed at the one or more side(s) of the at least one middle light source is more than one. Herein, there is one or more the middle light source(s) inserted between the edge light sources.

In an embodiment of the present invention, the at least one edge light source is disposed near a boundary of the regions of the light guide plate.

In one embodiment of the present invention, the regions of the light guide plate are respectively a single sub-light guide plate, the sub-light guide plates are joined together to form the light guide plate, and each sub-light guide plate has one light incident surface.

In one embodiment of the present invention, each sub-light guide plate has a first side surface and a second side surface disposed oppositely, a portion of the first side surface serves as the light incident surface, and another portion of the first side surface has a joining region contacting with the second side surface of the adjacent sub-light guide plate.

In one embodiment of the present invention, the sub-light guide plates are respectively a wedge type light guide plate or a flat type light guide plate.

In one embodiment of the present invention, the light guide plate is a wedge type light guide plate or a flat type light guide plate.

In an embodiment of the present invention, the backlight module further includes an optical film set disposed above the light guide plate.

The present invention further provides a display apparatus including a display panel and the above-mentioned backlight module.

According to the aforementioned, each light source set is disposed at the light incident surface of one of the regions of the light guide plate, and each light source set is divided into the at least one middle light source in the middle region and the at least one edge light source at the edge. Each of the controlling circuits is used to control the at least one middle light source corresponding to the region of the light guide plate and the at least one edge light source corresponding to the adjacent region of the light guide plate. Therefore, the joining boundary between the regions of the light guide plate or the sub-light guide plates can be blurred to resolve the joining boundary displayed on an image, so as to increase the light emitting uniformity of the backlight module and improve the display quality of a display apparatus using the backlight module.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

FIGS. 4A-4E show schematic views of backlight modules according to embodiments of the present invention, a schematic view of a conventional backlight module, and the brightness variations thereof.

FIGS. 5A-5C show schematic views of two backlight modules according to embodiments of the present invention, a schematic view of a conventional backlight module, and the brightness variations thereof.

FIGS. 5D-5F show schematic views of backlight modules according to embodiments of the present invention, a schematic view of a conventional backlight module, and brightness variations thereof.

DESCRIPTION OF EMBODIMENTS

A backlight module is provided, in which the light guide plate has a plurality of regions, and each region of the light guide plate has a light incident surface correspondingly. Each controlling circuit is used for one light incident surface of the light guide plate, and thus the light sources at the middle of a region and the light sources at the edge of the adjacent region are lit or turned off at the same time, so as to reduce the sharp contrast from brightness difference at the joining boundary between the regions of the light guide plate. Therefore, the total light emitting uniformity of the backlight module can be increased and the sharp joining boundary generated in the boundary of the regions of the light guide plate can be avoided, so as to improve the display quality. Several embodiments of the backlight modules will be described in details in the following with reference to accompany the drawings.

Figure 1:
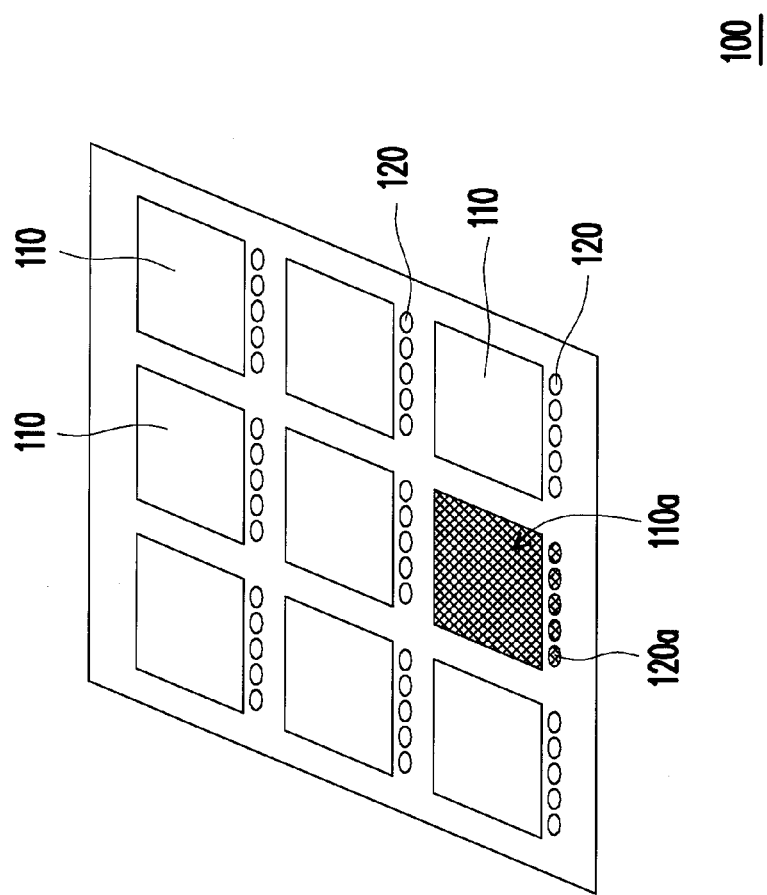
FIG. 1 is a schematic view illustrating a conventional backlight module.
Figure 2A:
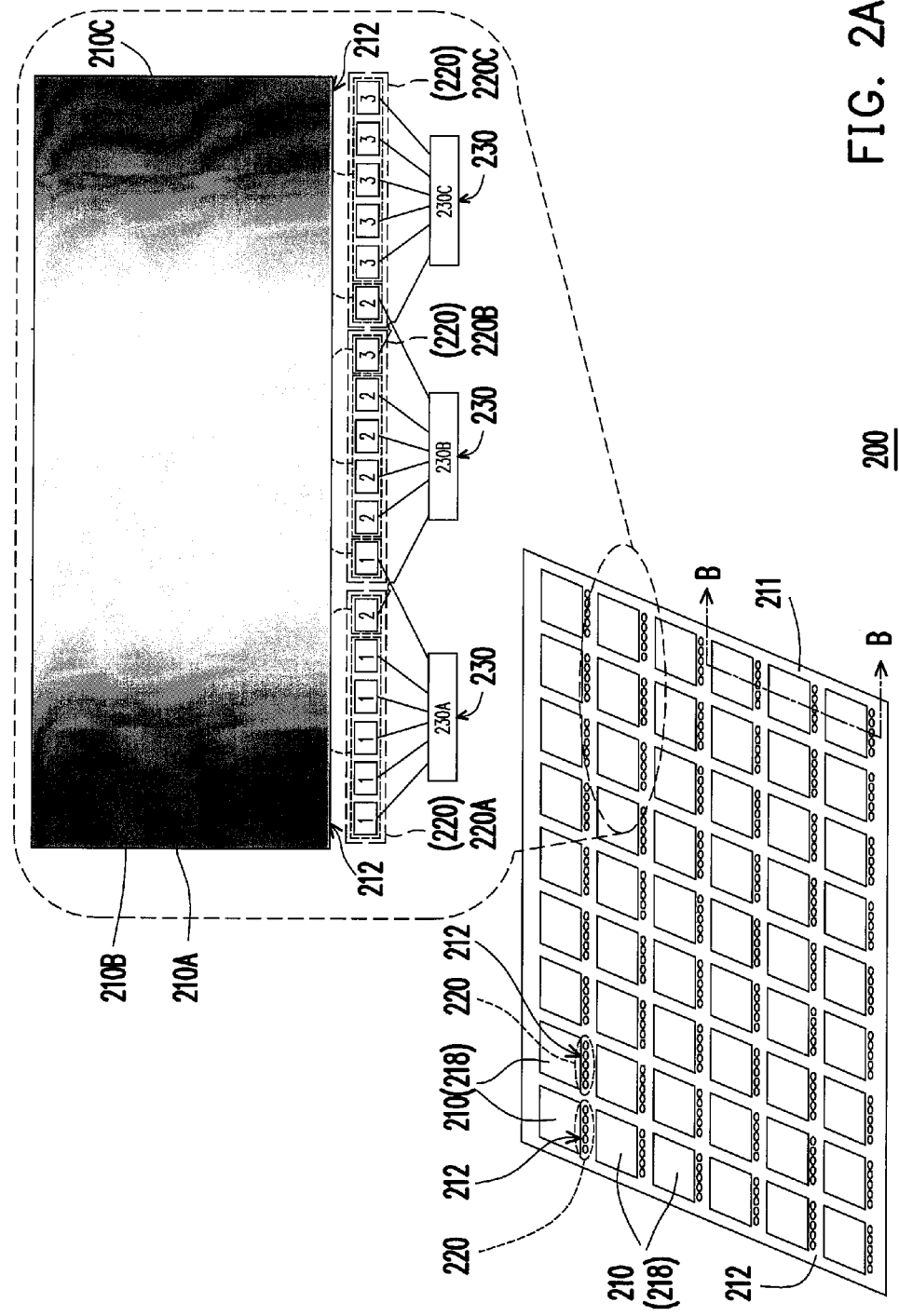
FIG. 2A is a schematic view illustrating a backlight module according to an embodiment of the present invention.

FIG. 2A is a schematic view illustrating a backlight module according to an embodiment of the present invention. Referring to FIG. 2A, the backlight module 200 includes a light guide plate 211 having a plurality of regions 210, a plurality of light source sets 220, and a plurality of controlling circuits 230. The regions 210 are joined together, and each region 210 has one light incident surface 212. Each light source set 220 is disposed at the light incident surface 212 of one of the regions 210. In order to describe the relationship between the regions 210, the light source sets 220 and the controlling circuits 230 of the light guide plate 211, a enlarged view of a portion of the backlight module 200 in FIG. 2A is illustrated in details. Referring to FIG. 2A, each light source set 220 comprises at least one middle light source 222 and at least one edge light source 224. The middle light source 222 is disposed in a middle region of the light source set 220, and the edge light source 224 is disposed at an edge of the light source set 220. Each controlling circuit 230 is electrically connected to the middle light source 222 of one of the light source sets 220, and the edge light source 224 of each light source set 220 is electrically connected to the controlling circuit 230 of the adjacent light source set 220. Therefore, the joining boundary between the adjacent regions 210 is blurred so as to avoid the grid type display mura in the joining boundary using the conventional backlight module. The backlight module 200 of the embodiment is not only applied to the LCD panel but also applied to flexible flat display panels, electronic papers display panels, touch panels or other flat display panels to improve the display quality.

The edge light source 224 is disposed near a boundary of the regions 210, for example. For each light source set 220, the edge light source 224 is disposed at one or more side of the middle light source 222. In each light source set 220 of the backlight module 200 of FIG. 2A, the middle light source 222 comprises light emitting diodes (LEDs), for example, and the number of the edge light source 224 disposed at one or more side of the middle light source 222 is one. The middle light source 222 in each region 210 and the edge light source 224 in the adjacent region 210 are electrically connected to the same controlling circuit 230.

In the following, the light sources electrically connected to the controlling circuit 230A and correspond to the region 210A of the light guide plate 211 are signed as "1". The light sources electrically connected to the controlling circuit 230B and correspond to the region 210B of the light guide plate 211 are signed as "2". The light sources electrically connected to the controlling circuit 230C and correspond to the region 210C of the light guide plate 211 are signed as "3".

In details, the middle light source 222A in the region 210A and the edge light source 224B in the region 210B are electrically connected to the same controlling circuit 230A. The middle light source 222B in the region 210B, the edge light source 224A in the adjacent region 210A, and the edge light source 224C in the adjacent region 210C are electrically connected to the same controlling circuit 230B. When a lighting signal is input into the light sources signed as "2" by the controlling circuit 230B, the middle light source 222B in the region 210B, the edge light source 224A in the region 210A and the edge light source 224C in the region 210C are lit. At this time, because the lighting signal is not input into the light sources signed as "1" and "3" by the controlling circuits 230A, 230C, the edge light sources 224B in the region 210B which signed as "1" and "3" are not lit. Because the edge light sources 224B at the edge of the region 210B are not lit, the brightness at this area is reduced. However, since the light guide plate has light guiding effect, partial light of the middle light source 222B is still introduced into the edge of the region 210B to present little brightness. In addition, the edge light source 224A in the region 210A adjacent the region 210B signed as "2" is lit by the controlling circuit 230B, the edge light source 224C signed as "2" is lit, and the edge light source 224C in the region 230B adjacent the region 210B signed as "2" is also lit by the controlling circuit 230B. Similarly, even though the middle light sources 222A, 222C in the regions 210A, 210C are not lit, the regions 210A, 210C of the light guide plate have light guiding effect, partial light of the lit edge light sources 224A, 224C is introduced into the regions 210A, 210C, so that the gradient brightness variation is presented in the regions 210A, 210C.

It is noted that the boundary between the regions having sharp brightness variation is avoided when the region 210 of the backlight module 200 is in an all white state or in an all black state, so as to resolve the display mura shown in the boundary between the adjacent regions. In details, in the backlight module 200 of the embodiment as shown in FIG. 2A, the brightness variation from the middle region to the edges of the region 210B is smoother, and the boundaries between the region 210B and the region 210A and between the region 210B and the region 210C have little brightness, such that the boundary of the region 210B is blurred, and a sharp boundary does not displayed on an image of the display.

It is noted that in the above mentioned backlight module, each region 210 of the light guide plate 211 is a sub-light guide plate 218. These sub-light guide plates 218 are joined together to form the light guide plate 211, and each sub-light guide plate 218 has one light incident surface 212. Therefore, the boundary between the sub-light guide plates 218 having sharp brightness variation can be avoided when the sub-light guide plate 218 of the backlight module 200 is in an all white state or in an all black state. Thereby, the display mura shown in the boundary of the sub-light guide plates is resolved.

In addition, in the backlight module, the number of the regions or the sub-light guide plates depends on the size and thickness of the product, the light guiding effect of the sub-light guide plate, the number of the light sources, the number of the controlling circuits, the cost and the like. The number and the size of the regions or the sub-light guiding plates can be adjusted by the designer according to the product demands. The present invention does not limit the number of the regions and the sub-light guiding plates in the backlight modules 200.

Figure 2B:
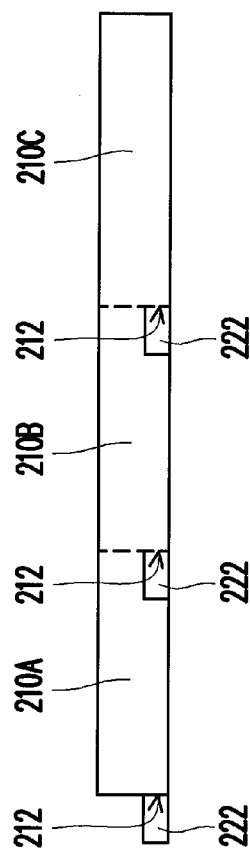
FIG. 2B is a schematic cross-sectional view taken along a section line B-B depicted in the backlight module of FIG. 2A.

FIG. 2B is a schematic cross-sectional view taken along a section line B-B depicted in the backlight module of FIG. 2A. With reference to FIG. 2B, in this embodiment, each region 210A, 210B or 210C has a light incident surface 212, and a light source set 222 is correspondingly disposed on the light incident surface 212. The regions 210A, 210B and 210C are joined together. According to the present embodiment, the whole light guide plate is divided into the regions 210A, 210B, and 210C. Certainly, each region may be a sub-light guide plate. In the embodiment, the sub-light guide plate is a flat light guide plate, for example. The present invention does not limit the configuration of each region of the light guide plate.

Figure 2C:
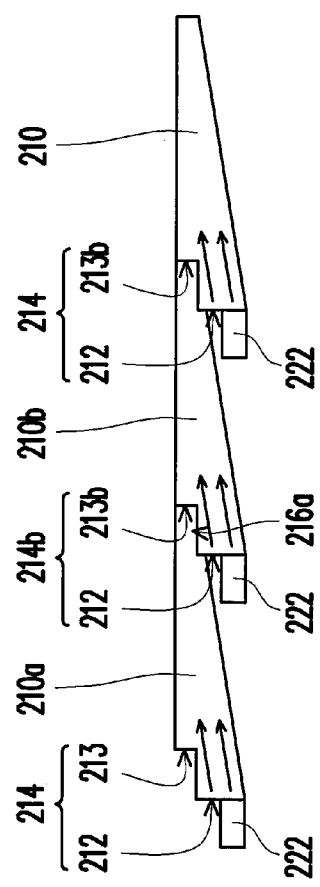
FIG. 2C is a schematic cross-sectional view taken along a section line B-B depicted in the backlight module of FIG. 2A.

FIG. 2C is a schematic cross-sectional view taken along a section line B-B depicted in the backlight module of FIG. 2A, and in the embodiment, each region of the light guide plate is a sub-light guide plate. Referring to FIG. 2C, in the embodiment, one sub-light guide plate is in one region 210, and the sub-light guide plate is a wedge type light guide plate. Each region 210 has a first side surface 214 and a second side surface 216 disposed oppositely, for example. A portion of the first side surface serves as the light incident surface 212. Another portion of the first side surface 214 has a joining region 213 contacting with the second side surface 216 of the adjacent region 210. For example, the second side surface 216a of the region 210a contacts with the joining region 213b of the first side surface 214b of the region 210B. Thereby, the assembling process for the backlight module 200 is simplified and the mechanical strength of the backlight module 200 can also be increased. The light source of the region 210 is disposed underneath the former region 210 has advantages of reducing the light mixing distance and avoiding the light source obviously displayed on an image, so as to achieve emitting uniform light. Of course, an optical film set can further be disposed above the regions 210 based on the product demands to achieve the required optical effects, but the present invention does not limit.

In order to describe how to reduce the brightness variation in the boundary between the regions of the light guide plate, the backlight module 200 of FIG. 2A and the brightness variation thereof are illustrated in the following paragraphs.

Figure 3:
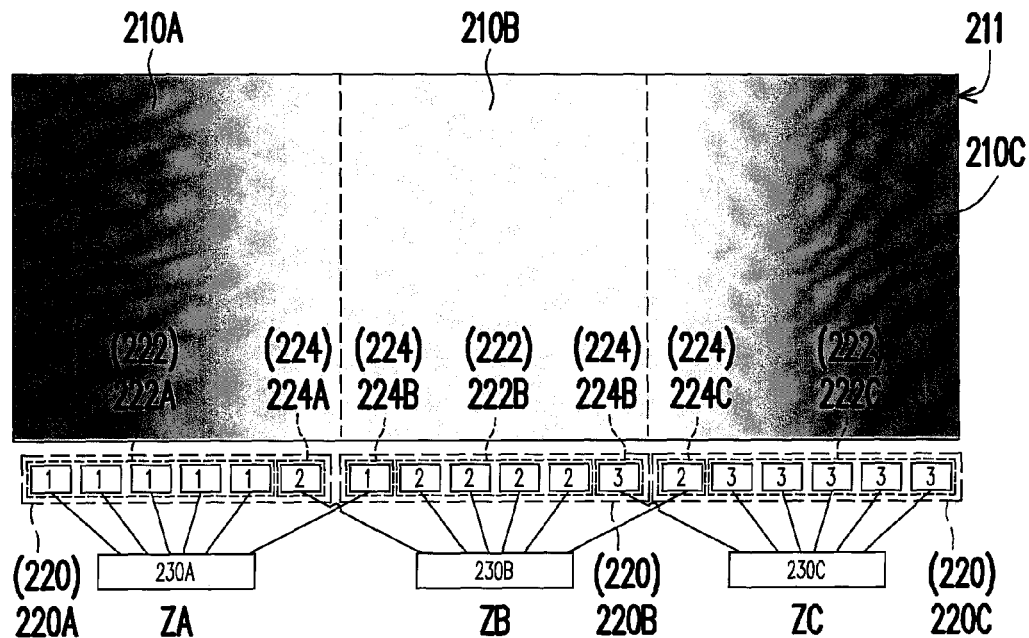
FIG. 3 shows the brightness variation of the backlight module of FIG. 2A and the brightness variation of a conventional backlight module.
Figure 3:
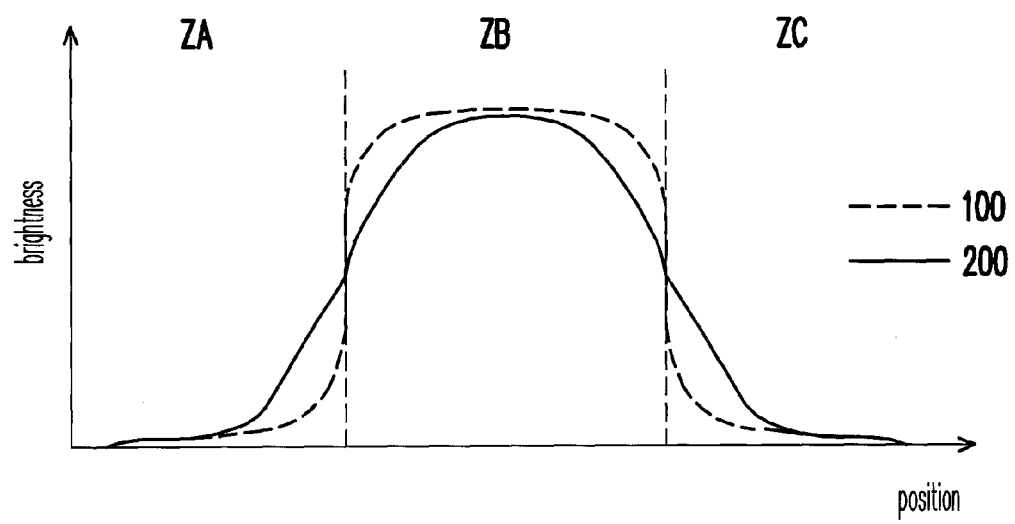

FIG. 3 shows the brightness variation of the backlight module of FIG. 2A and the brightness variation of a conventional backlight module. The dotted-line curve represents the brightness variation of the conventional backlight module 100. The solid-line curve represents the brightness variation of the backlight module 200 of the embodiment. Referring to FIG. 3, the light emitting regions ZA, ZB and ZC respectively correspond to the regions 210A, 210B and 210C. The curve 100 in FIG. 3 shows that the brightness variation in the boundary of the light guide plate of the backlight module 100 is sharper, and thus a boundary is easily displayed on an image and the display quality is deteriorated. Moreover, the curve 200 in FIG. 3 shows that the brightness variation in the boundary between the regions 210A, 210B and 210C of the backlight module 200 of the embodiment is smoother, and thereby the brightness variation at the boundary is blurred and the display quality is improved.

The present invention does not limit the number of the edge light source and the arrangement between the edge light source and the middle light source. FIG. 4 shows several designs of the edge light source and the brightness variations thereof.

Figure 4B:
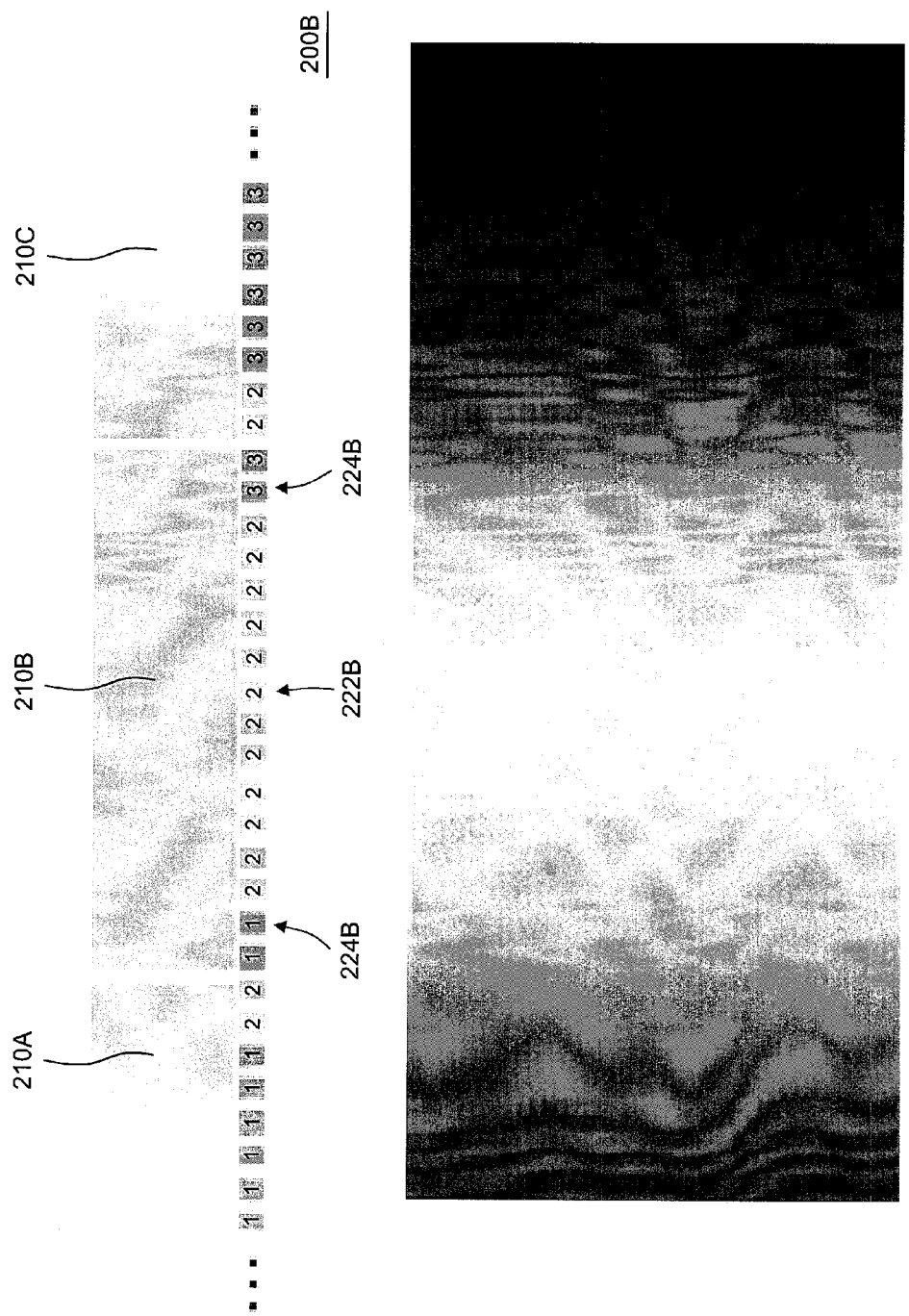

FIGS. 4A-4E show schematic views of backlight modules according to embodiments of the present invention, a schematic view of a conventional backlight module, and the brightness variations thereof. The top portions of FIGS. 4A-4E show the configuration of the conventional backlight module 100 and the configurations of the backlight modules 200 according to the embodiments. The bottom portions of FIGS. 4A-4E show the brightness variation of the conventional backlight module 100 and the brightness variations of the backlight modules 200 according to the embodiments. Referring to FIG. 4A, each region of the light guide plate 110 of the backlight module 100 corresponding to the light source 120 is in an all white state or in an all black state. In the brightness variation of FIG. 4A, an obvious boundary is shown on the image.

Figure 4C:
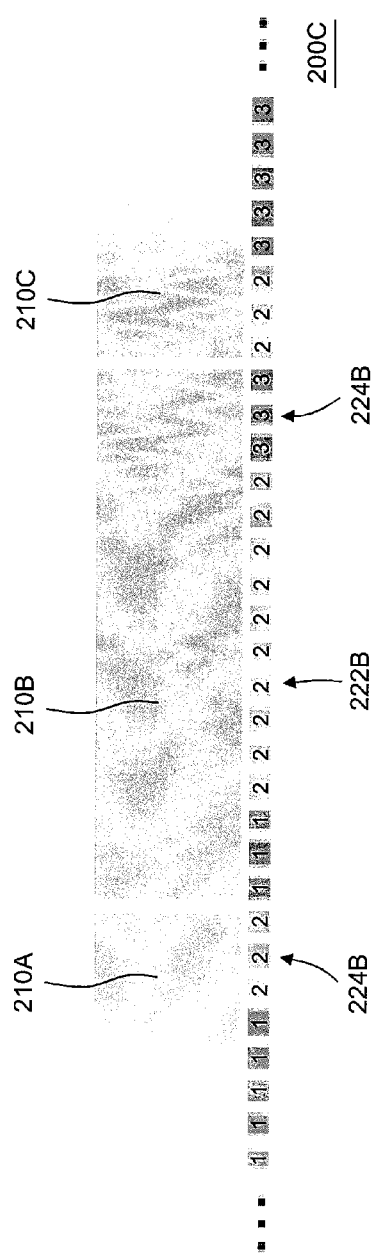
Figure 4C:
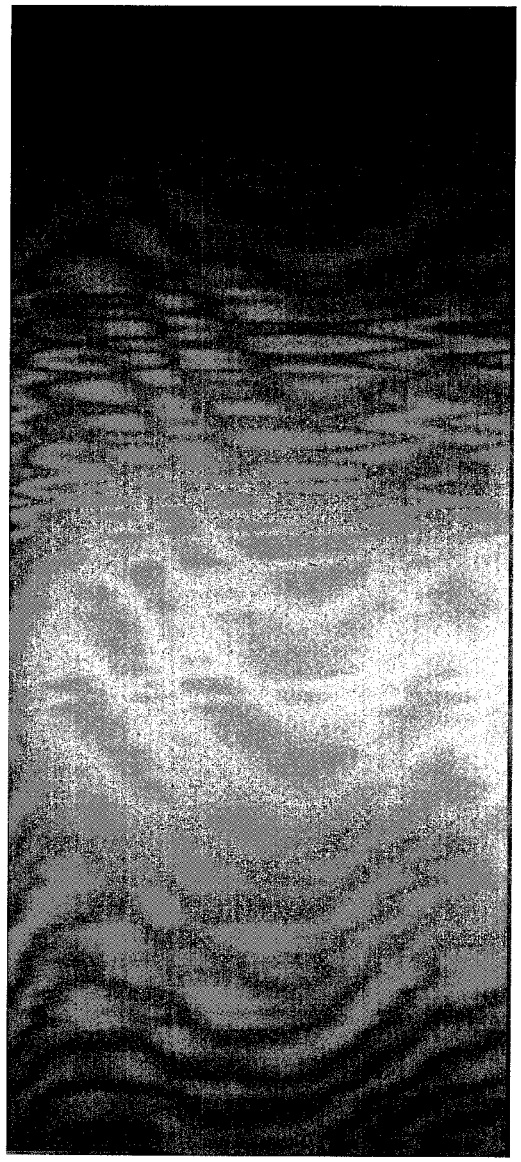

Referring to FIG. 4B, in the region 210B among the regions 210A, 210B, 210C of the backlight module 200B of the embodiment, the light sources in the middle region signed as "2" are the middle light source 222B, and the light sources at the edges signed as "1" or "3" are the edge light source 224B. The number of the edge light source 224B in the embodiment is two, and the brightness variation of FIG. 4B shows the boundary of the light guide plate is blurred. Referring to FIG. 4C, in the region 210B among the regions 210A, 210B, 210C of the backlight module 200C of the embodiment, the light sources in the middle region signed as "2" are the middle light source 222B, and the light sources at the edges signed as "1" or "3" are the edge light source 224B. The number of the edge light source 224B in the embodiment is three, and the brightness variation of FIG. 4C shows the boundary of the light guide plate is also blurred.

Figure 4D:
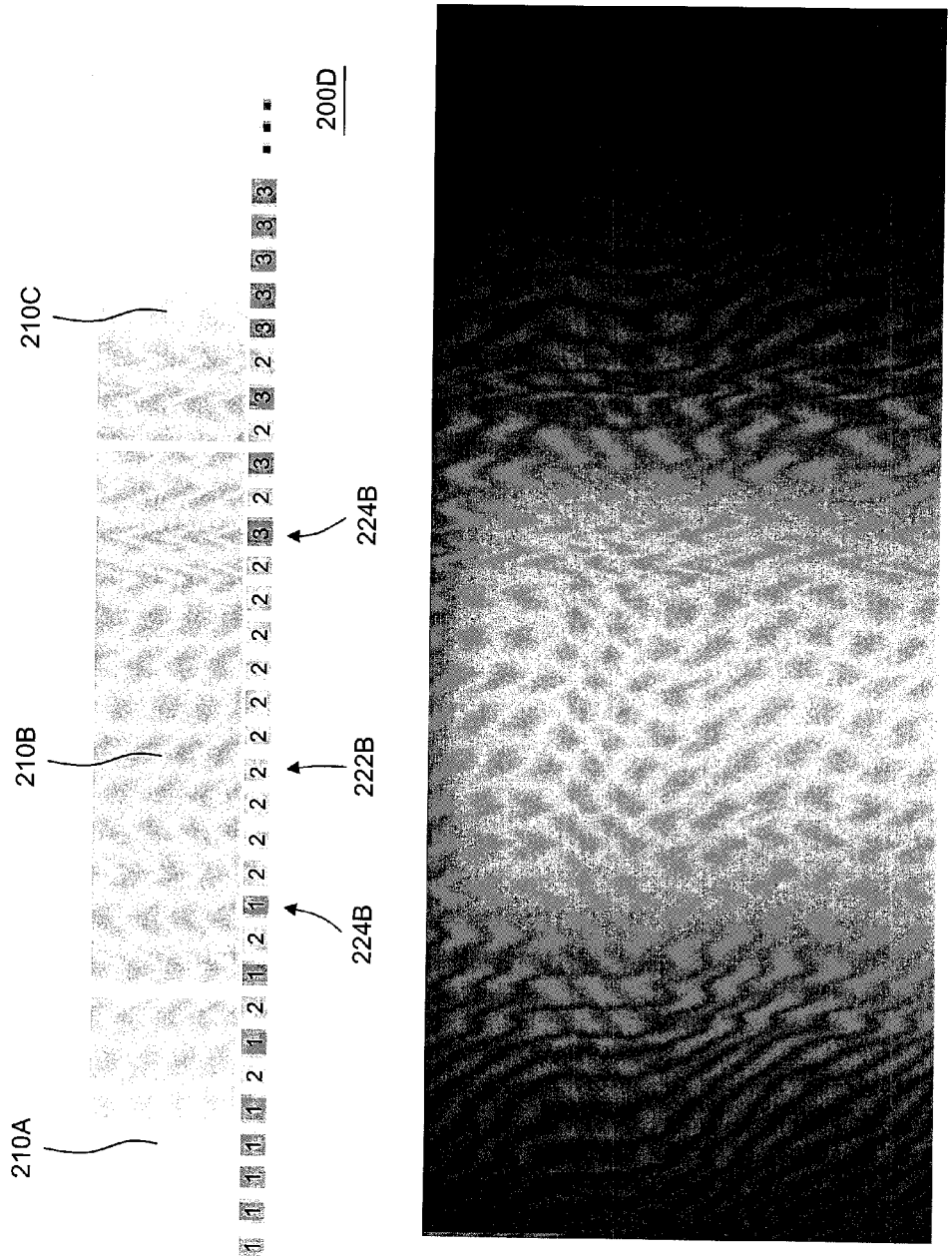

The edge light source 224 and the middle light source may be alternatively arranged at the edges of the regions 210A, 210B and 210C. As shown in FIG. 4D, in the region 210B among the regions 210A, 210B, 210C of the backlight module 200D of the embodiment, the light sources in the middle region signed as "2" are the middle light source 222B, and the light sources at the edges signed as "1" or "3" are the edge light source 224B. As shown in FIG. 4E, in the region 210B among the regions 210A, 210B, 210C of the backlight module 200E of the embodiment, the light sources in the middle region signed as "2" are the middle light source 222B, and the light sources at the edges signed as "1" or "3" are the edge light source 224B. More specifically, there is one or more light source(s), which signed as "1", inserted between the light sources of the edge light source 224B signed as "3" or "1". The brightness variation of FIG. 4E shows the boundary of the light guide plate is also blurred.

The following provides some representative embodiments to illustrate the light emitting effects of the backlight module, but the invention is not limited thereto.

Figure 5A:
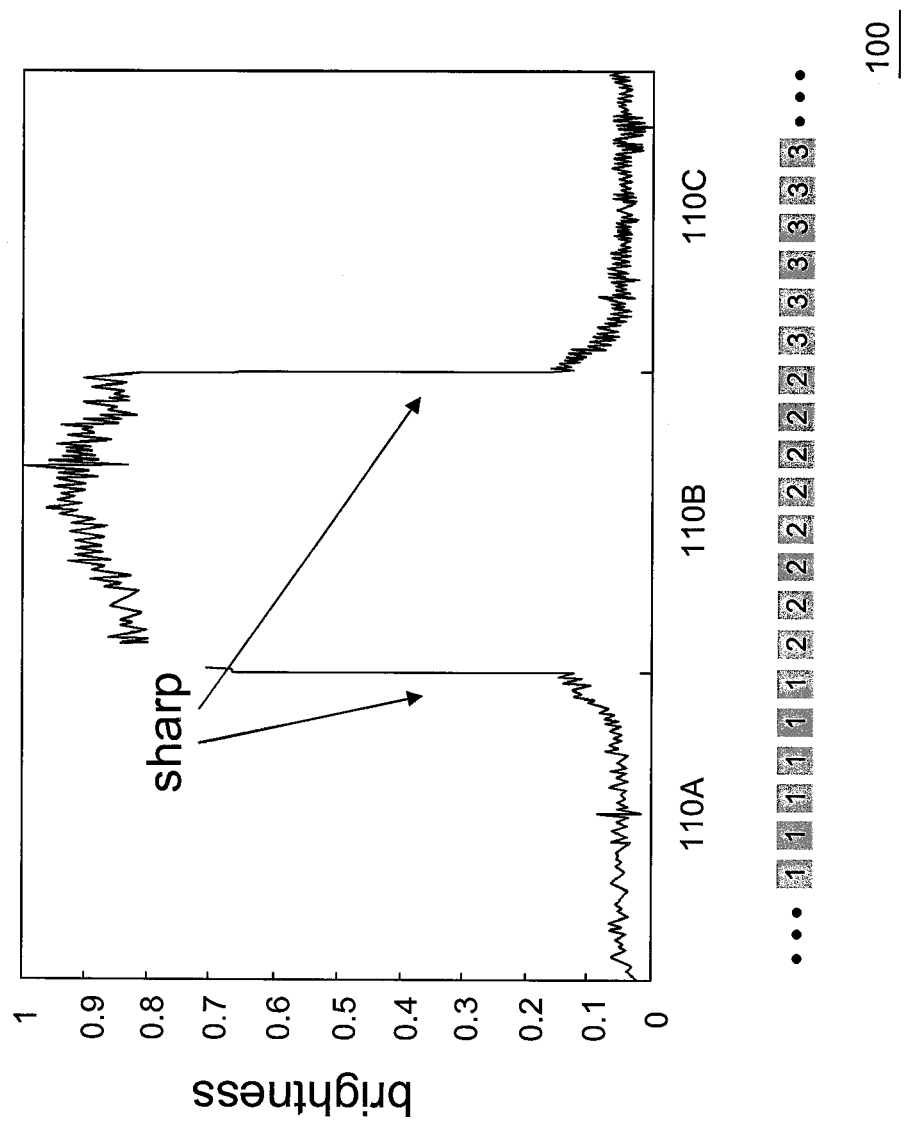
Figure 5B:
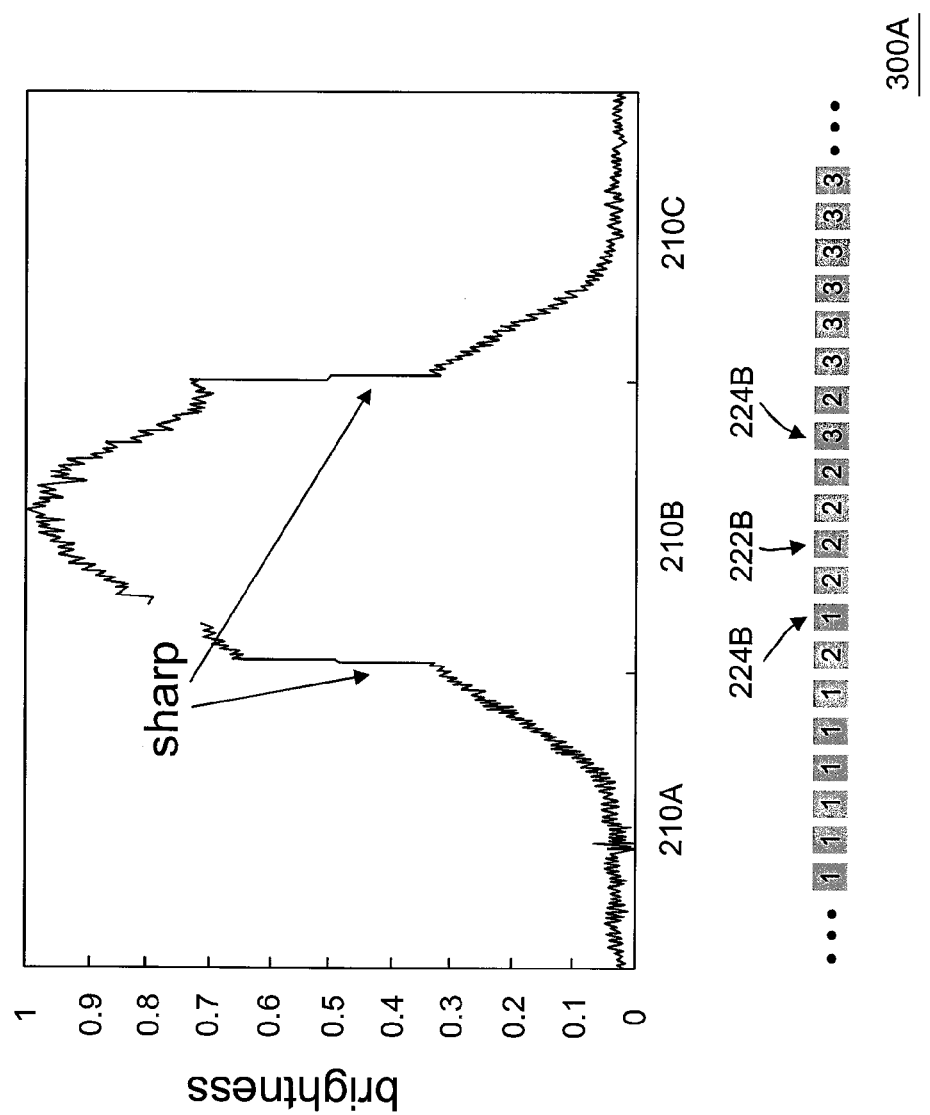

FIGS. 5A-5C show schematic views of two backlight modules according to embodiments of the present invention, a schematic view of a conventional backlight module, and the brightness variations thereof. Referring to FIG. 5B and FIG. 5C, the backlight modules 300A, 300B of the embodiments are suitable for 46-inch display. The backlight modules 300A, 300B are formed by joining 16*8 array-arranged regions 210A, 210B, 210C, and 16 LEDs are disposed in each of the regions 210A, 210B, 210C. The conventional backlight module 100 of FIG. 5A is formed by joining the light guide plates 110A, 110B, 110C. Two backlight modules 300A, 300B are respectively shown in FIG. 5B and FIG. 5C. As FIGS. 5A-5C shown, comparing with the conventional backlight module 100, the backlight modules 300A, 300B have an advantage of blurring the boundary of the light guide plate, so as to improve the display quality.

Figure 5D:
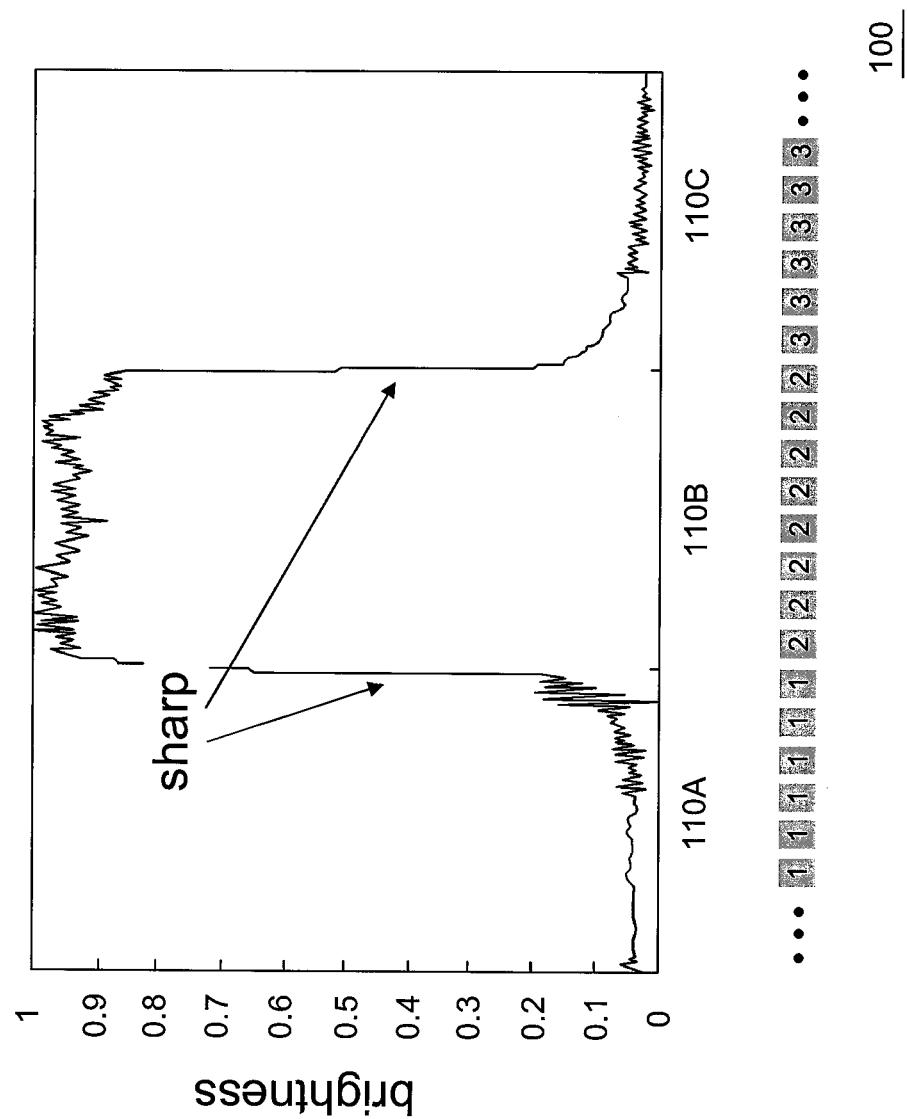
Figure 5E:
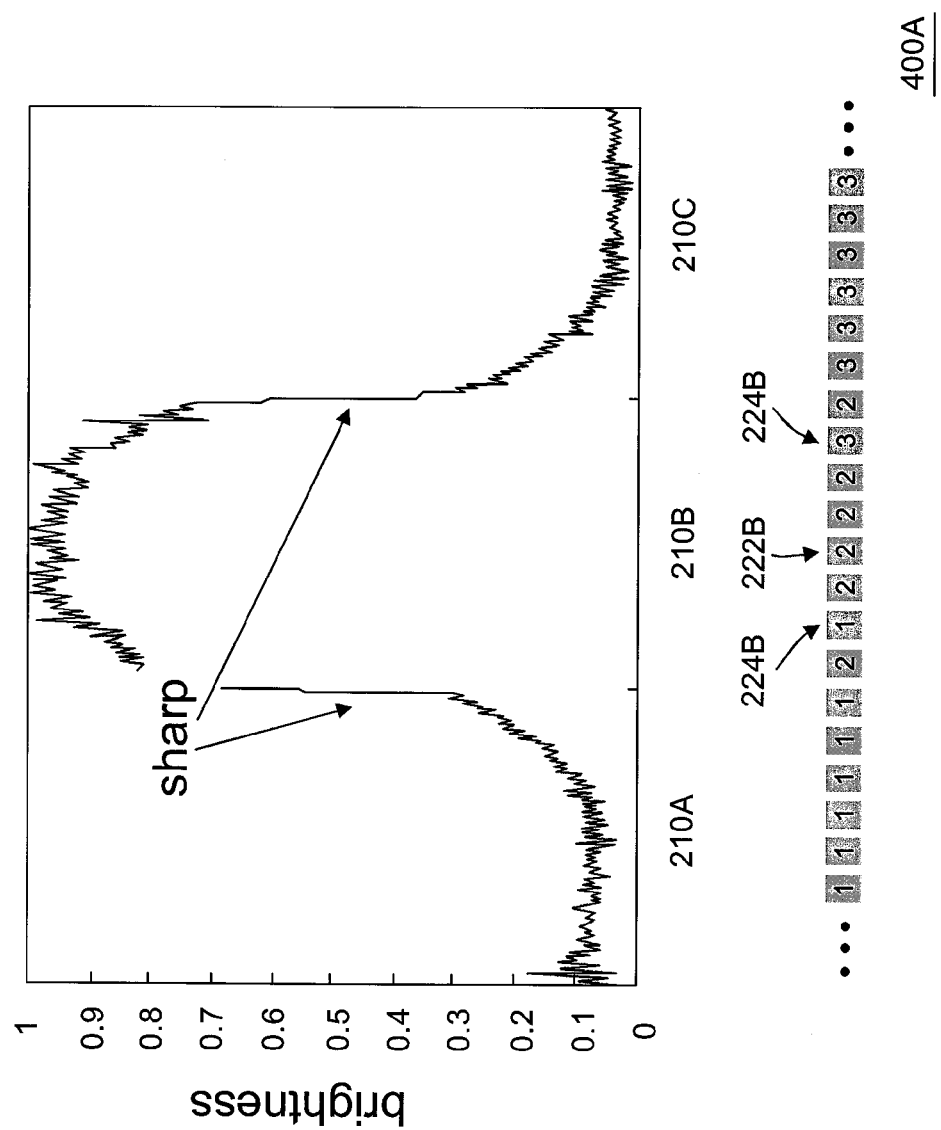

FIGS. 5D-5F show schematic views of another backlight module according to embodiments of the present invention, a schematic view of a conventional backlight module, and the brightness variations thereof. Referring to FIG. 5E and FIG. 5F, the backlight modules 400A, 400B of the embodiments are suitable for 65-inch display. The backlight modules 400A, 400B are formed by joining 16*8 array-arranged regions 210A, 210B, 210C, and 24 LEDs are disposed in each of the regions 210A, 210B, 210C. The conventional backlight module 100 of FIG. 5D is formed by joining the light guide plates 110A, 110B, 110C, and two backlight modules 400A, 400B are shown in FIG. 5E and FIG. 5F. From FIGS. 5D-5F shown, comparing with the conventional backlight module 100, the backlight modules 400A, 400B have advantages of blurring the boundary of the light guide plate, so as to improve the display quality.

Figure 6:
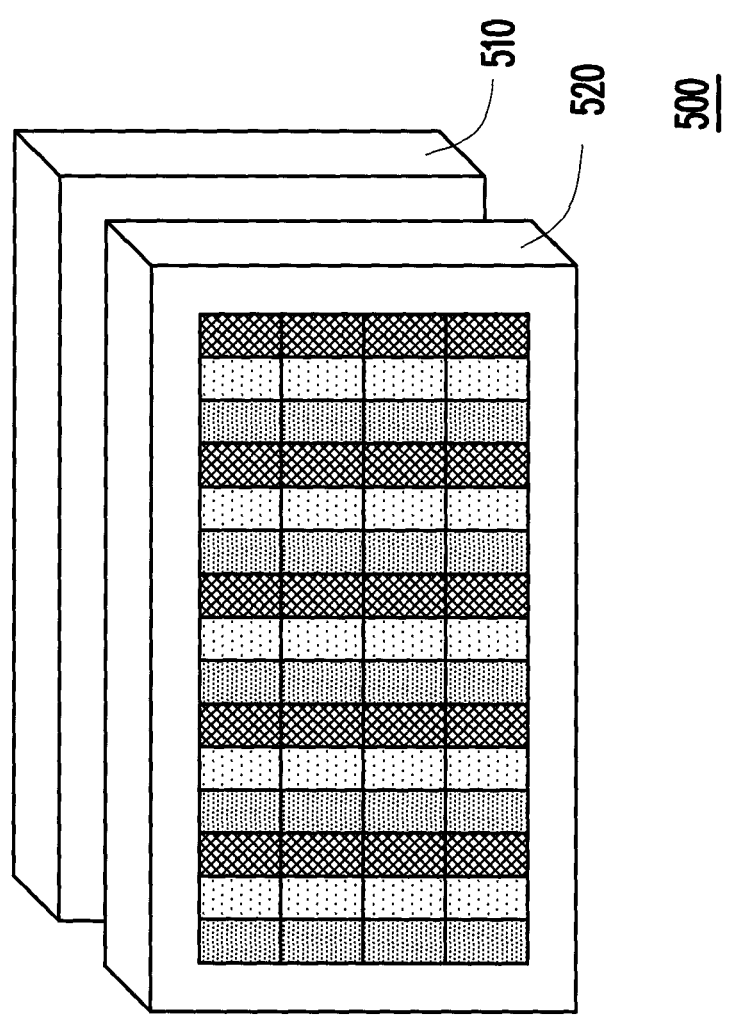
FIG. 6 is a schematic view illustrating a display apparatus of the present invention.

The backlight module can be applied to display apparatus. FIG. 6 is a schematic view illustrating a display apparatus of the present invention. Referring to FIG. 6, the display apparatus 500 includes a display panel 520 and a backlight module 510, and the display panel 520 is a LCD panel, for example. The backlight module 510 can be any one of the backlight modules 200, 200B, 200C, 200D, 200E, 300A, 300B, 400A and 400B. The display apparatus 500 having the above mentioned backlight module 510 has advantages of having smooth brightness variation in the boundary of the light guide plate and reducing the display mura on an image, so as to increase the dynamic contrast, the display quality and achieve the thinness of the display.

According to the aforementioned, the light source set disposed on the light incident surface of each region has at least one middle light source and at least one edge light source. The middle light source in each region and the edge light source in the adjacent region are electrically connected to the same controlling circuit, such that the middle light source in each region and the edge light source in the adjacent region are lit at the same time. Therefore, the joining boundary between the regions of the light guide plate can be blurred so as to avoid the joining boundary displayed on an image, increase the light uniformity of the backlight module, and improve the display quality of a display apparatus using the backlight module.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A backlight module, comprising:

a light guide plate, having a first region and a second region, wherein the first region and the second region of the light guide plate have a light incident surface respectively, and a boundary between the first region and the second region;

a first light source set, having a plurality of first middle light sources and at least one first edge light source, wherein the plurality of the first middle light sources are disposed corresponding to the first region of the light guide plate, and the first edge light source is disposed corresponding to the second region of the light guide plate and is disposed adjacent to an edge of the first region of the light guide plate;

a second light source set, having a plurality of second middle light sources and at least one second edge light source, wherein the plurality of the second middle light sources are disposed corresponding to the second region of the light guide plate, and the second edge light source is disposed corresponding to the first region of the light guide plate, the second edge light source is disposed adjacent to the plurality of the first middle light sources and is disposed adjacent to an edge of the second region of the light guide plate, the first edge light source is disposed adjacent to the plurality of the second middle light sources, wherein the first region is adjacent to the second region and do not overlap with the second region;

a first controlling circuit, electrically connected to the plurality of the first middle light sources of the first light source set, and a second controlling circuit, electrically connected to the plurality of the second middle light sources of the second light source set, wherein the first controlling circuit controls the first middle light source and the first edge light source of the first light source set to light up or not simultaneously, and the second controlling circuit controls the second middle light source and the second edge light source of the second light source set to light up or not simultaneously.

2. The backlight module according to claim 1, wherein at least one of the second edge light source of the second light source set is disposed at one or more side(s) of at least one of the first middle light source of the first light source set, and at least one of the first edge light source of the first light source set is disposed at one or more side(s) of at least one of the second middle light source of the second light source set.

3. The backlight module according to claim 2, wherein the number of at least one of the second edge light source disposed at the one or more side(s) of at least one of the first middle light source is more than one, and the number of at least one of the first edge light source disposed at the one or more side(s) of at least one of the second middle light source is more than one.

4. The backlight module according to claim 3, wherein there is one or more of the first middle light source(s) inserted between the second edge light sources, and there is one or more of the second middle light source(s) inserted between the first edge light sources.

5. The backlight module as claimed in claim 1, wherein at least one of the second edge light source or at least one of the first edge light source is disposed near the boundary of the regions of the light guide plate.

6. The backlight module according to claim 1, wherein the first region and the second region of the light guide plate are respectively a single sub-light guide plate, the sub-light guide plates are joined together to form the light guide plate, and each sub-light guide plate has one light incident surface.

7. The backlight module according to claim 6, wherein each sub-light guide plate has a first side surface and a second side surface disposed oppositely, a portion of the first side surface serves as the light incident surface, and another portion of the first side surface has a joining region contacting with the second side surface of an adjacent sub-light guide plate.

8. The backlight module according to claim 6, wherein the sub-light guide plates are respectively a wedge type light guide plate or a flat type light guide plate.

9. The backlight module according to claim 1, wherein the light guide plate is a wedge type light guide plate or a flat type light guide plate.

10. The backlight module as claimed in claim 1, further comprising an optical film set disposed above the light guide plate.

11. A display apparatus, comprising:
a display panel; and
a backlight module of claim 1.

12. The display apparatus as claimed in claim 11, wherein the display panel comprises a liquid crystal display panel, a flexible flat display panel, an electronic paper display panel or a touch panel.

13. The backlight module according to claim 1, wherein the first controlling circuit, the second controlling circuit, the first light source set and the second light source set is arranged so that only one of the controlling circuit corresponds to only one set of the middle light source of the light source set.

14. The backlight module according to claim 1, wherein the first controlling circuit is disposed corresponding only to the first region of the light guide plate and the second controlling circuit is disposed corresponding only to the second region of the light guide plate.

15. The backlight module according to claim 1, wherein the first edge light source of the first light source set is electrically connected to the first controlling circuit and the second edge light source of the second light source set is electrically connected to the second controlling circuit.

16. The backlight module according to claim 1, wherein the light guide plate further comprising a third region, and the third region has a light incident surface and a boundary between the second region and the third region, wherein the second region is adjacent to the third region and do not overlap with the third region.

17. The backlight module according to claim 16, further comprising a third light source set, wherein the third light source set comprises a plurality of third middle light sources and at least one third edge light source, the plurality of the third middle light sources are disposed corresponding to the third region of the light guide plate, and the third edge light source is disposed corresponding to the second region of the light guide plate, the third edge light source is disposed adjacent to the plurality of the second middle light sources and is disposed adjacent to an edge of the second region of the light guide plate.

18. The backlight module according to claim 17, wherein the second edge light source is disposed adjacent to the plurality of third middle light sources and is disposed adjacent to an edge of the third region of the light guide plate.

19. The backlight module according to claim 17, further comprising a third controlling circuit, electrically connected to the plurality of the third middle light sources and the third edge light source of the third light source set such that the third controlling circuit controls the third middle light source and the third edge light source of the third light source set to light up or not simultaneously.

20. The backlight module according to claim 17, wherein the number of at least one of the third edge light source disposed at the one or more side(s) of at least one of the second middle light source is more than one.

\* \* \* \* \*